(12) United States Patent
Inui et al.

(10) Patent No.: US 7,391,582 B2
(45) Date of Patent: Jun. 24, 2008

(54) OBJECTIVE LENS HOLDER, OBJECTIVE LENS DRIVING DEVICE INCLUDING SAME AND OPTICAL DISK READ/WRITE DEVICE

(75) Inventors: Toshiharu Inui, Nara (JP); Takashi Kawano, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 70 days.

(21) Appl. No.: 11/292,904

(22) Filed: Dec. 1, 2005

(65) Prior Publication Data

US 2006/0119933 A1 Jun. 8, 2006

(30) Foreign Application Priority Data

Dec. 7, 2004 (JP) .............................. 2004-354584

(51) Int. Cl.
*G02B 7/02* (2006.01)
(52) U.S. Cl. .................... 359/819; 359/808; 359/385; 359/387; 356/446
(58) Field of Classification Search ................. 359/811, 359/813, 814, 819–821, 799–802, 808, 812, 359/835, 413, 514, 661, 387, 380, 355, 385, 359/722, 827, 381; 396/526, 529, 19, 199, 396/201, 322, 334; 369/44.14–44.16, 112.01, 369/244; 356/246, 446; 353/100, 101; 362/139, 362/244, 471; 126/200; 122/235.11
See application file for complete search history.

(56) References Cited

U.S. PATENT DOCUMENTS

| | | | | | |
|---|---|---|---|---|---|
| 2,028,505 | A | * | 1/1936 | Eitzen | 362/268 |
| 2,357,378 | A | * | 9/1944 | Benford | 359/385 |
| 3,046,837 | A | * | 7/1962 | Janos et al. | 359/387 |
| 3,490,421 | A | * | 1/1970 | Pincus | 122/235.11 |
| 3,531,177 | A | * | 9/1970 | Akin, Jr. | 359/413 |
| 3,556,086 | A | * | 1/1971 | Gordon | 600/248 |
| 3,572,887 | A | * | 3/1971 | Leitzsch | 359/431 |
| 3,786,907 | A | * | 1/1974 | Muncheryan | 400/696 |
| 4,206,978 | A | * | 6/1980 | Leopoldi | 359/819 |
| 5,076,682 | A | * | 12/1991 | Pasfield | 351/158 |
| 5,299,066 | A | * | 3/1994 | Rombult | 359/819 |
| 5,781,351 | A | | 7/1998 | Murakami et al. | |
| 5,859,727 | A | * | 1/1999 | Tsuchiya | 359/387 |

(Continued)

FOREIGN PATENT DOCUMENTS

JP 62-133220 8/1987

(Continued)

*Primary Examiner*—Loha Ben
(74) *Attorney, Agent, or Firm*—David G. Conlin; David A. Tucker; Edwards Angell Palmer & Dodge LLP (57) ABSTRACT

An objective lens holder of the present invention includes: (i) a cavity, having an entrance and an exit, which guides, to an objective lens, an incident light beam entering the entrance, the exit being provided on a side of the cavity where the objective lens is housed; and (ii) an aperture having an opening for limiting, to an effective diameter of the objective lens, a beam diameter of the incident light beam passing through the cavity. The cavity is surrounded with internal wall surfaces facing each other so that space between the internal wall surfaces gradually increases from the opening of the aperture toward the entrance or the exit. This makes it possible to provide a highly rigid objective lens holder that allows high speed read/write operations.

12 Claims, 8 Drawing Sheets

U.S. PATENT DOCUMENTS

| | | | |
|---|---|---|---|
| 6,400,501 B2 * | 6/2002 | Tsuchiya et al. | 359/380 |
| 6,487,026 B2 * | 11/2002 | Baartman et al. | 359/808 |
| 6,520,666 B1 * | 2/2003 | Beyerlein et al. | 362/471 |
| 6,665,132 B2 * | 12/2003 | Hendriks et al. | 359/819 |
| 6,665,259 B1 * | 12/2003 | Nakao | 720/681 |
| 7,142,307 B1 * | 11/2006 | Stark | 356/446 |

FOREIGN PATENT DOCUMENTS

| | | |
|---|---|---|
| JP | 62-133220 U | 8/1987 |
| JP | 03-147535 | 6/1991 |
| JP | 03-147535 A | 6/1991 |
| JP | 08-329508 | 12/1996 |
| JP | 09-326128 | 12/1997 |
| JP | 09-326128 A | 12/1997 |
| JP | 2000-011440 | 1/2000 |
| JP | 2000-011440 A | 1/2000 |
| JP | 2000-235719 | 8/2000 |
| JP | 2000-235719 A | 8/2000 |

* cited by examiner

PRIOR ART

FOCUS

RADIAL

FIG. 11

FOCUS

RADIAL

OBJECTIVE LENS HOLDER, OBJECTIVE LENS DRIVING DEVICE INCLUDING SAME AND OPTICAL DISK READ/WRITE DEVICE

This Nonprovisional application claims priority under 35 U.S.C. § 119(a) on Patent Application No. 354584/2004 filed in Japan on Dec. 7, 2004, the entire contents of which are hereby incorporated by reference.

FIELD OF THE INVENTION

The present invention relates to an objective lens holder, an objective lens driving device, and an optical disk read/write device.

BACKGROUND OF THE INVENTION

In order to precisely read/write an optical disk such as a CD, a DVD, or a BD (blue-ray disc), it is necessary to (i) cause light emitted from a light source to enter an objective lens so that a very small beam spot is formed on the optical disk, and to (ii) cause the beam spot to follow a desired recording track while maintaining a shape of the beam spot.

One of the components essential for realization of precise read/write of an optical disk is an aperture, i.e., an opening provided in an objective lens holder. An arrangement of the aperture is described, for example, in Patent Document (Japanese Unexamined Patent Publication 329508/1996 (Tokukaihei 8-329508; published on Dec. 13, 1996)).

Figure 8:
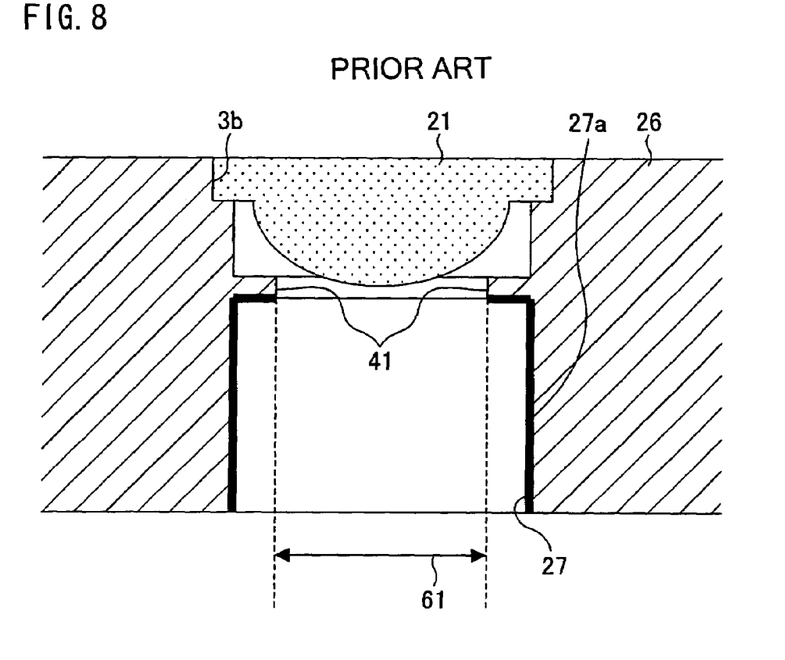
FIG. 8 is a side cross-sectional view schematically illustrating an arrangement of the conventional objective lens holder.

FIG. 8 is a side cross-sectional view schematically illustrating an arrangement of a conventional objective lens holder according to Patent Document 1. As illustrated in FIG. 8, the objective lens holder 26 includes a cavity 27. The cavity 27 guides, to an objective lens 21, a light beam emitted from a light source. On one side of the objective lens 21 facing a light source, an aperture 41 is provided.

As illustrated in FIG. 8, the aperture 41 is provided so as to be sandwiched between protrusions that stick out toward a center of the cavity 27 with respect to internal wall surfaces 27a of the cavity 27. The aperture 41 shields the light beam whose diameter is larger than an effective diameter 61 of the objective lens 21. Thus, the objective lens holder 26 is arranged such that the aperture 41 guides, to the objective lens 21, only the light beam whose diameter corresponds to the effective diameter of the objective lens 21.

Further, the aperture 41 makes it possible to shape, into a circular light beam, the light beam entering the objective lens 21 from the light source. Furthermore, even when the objective lens 21 is shifted, the light beam can be constantly shaped into the effective diameter 61.

However, the conventional objective lens holder 26 illustrated in FIG. 8 suffers from such a drawback that the aperture 41 is low in strength.

In recent years, an optical disk read/write device has been required to have a higher transfer rate. In order to realize the higher transfer rate, an objective lens driving device of the optical disk read/write device is required to control the objective lens at high frequencies, i.e., to realize a wide-bandwidth servo characteristic.

In order to realize the wide-bandwidth servo characteristic, a driving unit including the objective lens or objective lens holder needs to have a resonant frequency as high as possible. That is, there is a demand for such an arrangement that, even when the objective lens or objective lens holder is driven at high resonant frequencies, the light beam having an appropriate diameter that corresponds to the effective diameter of the objective lens enters the disk and the light beam reflected from the disk is appropriately detected by a photodetector. In order to realize such an arrangement, the objective lens holder needs to be highly rigid.

However, the objective lens holder 26 illustrated in FIG. 8 is arranged such that the aperture 41 is provided so as to be sandwiched between the protrusions that stick out toward the center of the cavity 27 with respect to the internal wall surfaces 27a of the cavity 27. With such an arrangement, the aperture 41 sandwiched between the protrusions is too weak.

With such an arrangement, the aperture itself becomes a source of resonant oscillation. As a result, the light beam having the appropriate diameter that corresponds to the effective diameter of the objective lens cannot enter the disk. Further, the oscillation of the aperture generates an unnecessary light beam added to the light beam returning to the photodetector. This generates resonant oscillation (phase distortion) in a control signal (feedback signal) of an actuator. As a result, control becomes impossible. Therefore, the conventional objective lens holder suffers from a drawback of being incapable of performing high-speed read/write operations.

SUMMARY OF THE INVENTION

The present invention has been made in view of the foregoing problems. The present invention has as an object to provide (i) an objective lens holder, (ii) an objective lens driving device, and (iii) an optical disk read/write device, all of which are highly rigid and allow high-speed read/write operations.

In order to solve the foregoing problems, an objective lens of the present invention includes: (i) a cavity, having an entrance and an exit, which guides, to an objective lens, an incident light beam entering the entrance, the exit being provided on a side of the cavity where the objective lens is housed; and (ii) beam diameter limiting means having an opening for limiting, to an effective diameter of the objective lens, a beam diameter of the incident light beam passing through the cavity, wherein the cavity is surrounded with internal wall surfaces facing each other so that space between the internal wall surfaces gradually increases from the opening of the beam diameter limiting means toward the entrance or the exit.

The description "surfaces facing each other so that space between the internal wall surfaces gradually increases from the opening of the beam diameter limiting means toward the entrance or the exit" means that the cavity is surrounded with the internal wall surfaces facing each other so that the space between the internal wall surfaces becomes larger than that of the opening of the aperture but smaller than that of the entrance or exit in at least one part of a region that extends from the opening to the entrance.

The conventional objective lens holder has been arranged such that the beam diameter limiting means is provided so as to be sandwiched between protrusions that stick out perpendicular to the internal wall surfaces of the cavity. For this reason, according to the conventional arrangement, the beam diameter limiting means is low in strength (rigidity). However, according to the foregoing arrangement, the beam diameter limiting means is not provided so as to be sandwiched between the protrusions that stick out perpendicular to the internal wall surfaces of the cavity. That is, the cavity is surrounded with the internal wall surfaces facing each other so that the space between the internal wall surfaces gradually increases from the opening of the beam diameter limiting means toward the entrance or the exit. This causes the beam diameter limiting means to be thicker walled as compared with the conventional beam diameter limiting means. Therefore, the beam diameter limiting means becomes more resistant to oscillation than the conventional beam diameter limiting means.

This causes the beam diameter limiting means to be stronger than the conventional beam diameter limiting means. Therefore, the foregoing arrangement makes it possible to cause the objective lens holder to be more rigid than the conventional objective lens holder.

Accordingly, the foregoing arrangement makes it possible to provide a highly rigid objective lens holder. Further, since the beam diameter limiting means is rigid, the beam diameter limiting means never becomes a source of resonant oscillation. This allows high-speed read/write operations.

In cases where the internal wall surfaces face each other so that the space between the internal wall surfaces gradually increases from the opening toward the entrance, the opening of the beam diameter limiting means is reinforced on the entrance side. On the other hand, in cases where the internal wall surfaces face each other so that the space between the internal wall surfaces gradually increases from the opening toward the exit, the opening of the beam diameter limiting means is reinforced on the exit side.

When the following conditions (1) and (2) are satisfied, the internal wall surfaces face each other so that the space between the internal wall surfaces gradually increases: (1) the space gradually increases on an entire circumference of the internal wall surfaces of the cavity; and (2) the space gradually increases partially on the internal wall surfaces of the cavity. In condition (1), the objective lens holder is strongest in terms of structural properties. In condition (2), the opening of the beam diameter limiting means is partially reinforced, and the beam diameter limiting means is partially provided with a thin wall part as with the conventional beam diameter limiting means. However, even in condition (2), the objective lens holder is more rigid than the conventional objective lens holder. Therefore, the objective lens holder allows read/write operations at a higher speed than the conventional objective lens holder.

In order to solve the foregoing problems, an objective lens driving device of the present invention includes the foregoing objective lens holder.

According to the foregoing arrangement, since the objective lens driving device includes the foregoing objective lens holder, the objective lens driving device becomes highly rigid and therefore exhibits a high resonant frequency. This brings about an effect of realizing a wide-bandwidth servo characteristic.

In order to solve the foregoing problems, an optical disk read/write device of the present invention includes the foregoing objective lens driving device.

Furthermore, since the optical disk read/write device of the present invention includes the foregoing objective lens driving device, the optical disk read/write device allows high-speed read/write operations.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 2(*a*) and 2(*b*) are cross-sectional views schematically illustrating arrangements of the objective lens holder whose internal wall surfaces are provided in a parabolic manner in cross section. In FIG. 2(*a*), parabolas of the internal wall surfaces in cross section peak on the side of an opening of an aperture. In FIG. 2(*b*), parabolas of the internal wall surfaces in cross section peak on the side of an entrance.

DESCRIPTION OF THE EMBODIMENTS

First Embodiment

Figure 1:
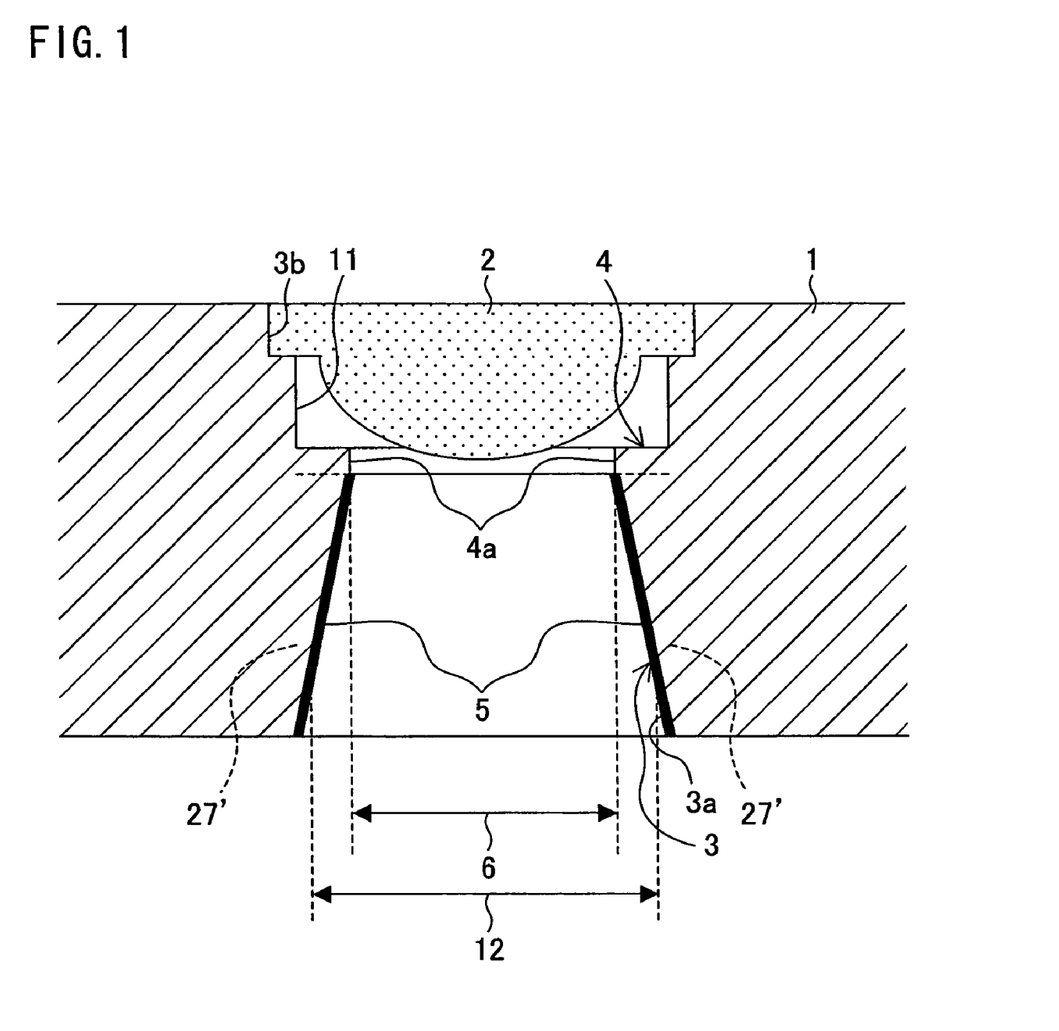
FIG. 1 is a cross-sectional view schematically illustrating an arrangement of an objective lens holder according to a first embodiment of the present invention.

One embodiment of the present invention will be described below with reference to FIGS. 1 to 4. FIG. 1 is a cross-sectional view schematically illustrating an arrangement of an objective lens holder according to the present embodiment.

As illustrated in FIG. 1, an objective lens holder 1 includes a cavity 3. The cavity 3 has an entrance 3*a* and an exit 3*b*. An incident light beam 12 enters the entrance 3*a* and exits from the exit 3*b*. Provided on the exit 3*b* side of the cavity 3 is an objective lens mounting part 11 for housing and mounting an objective lens 2 therein. The cavity 3 includes a function of guiding, to the objective lens 2, the incident light beam 12 entering the entrance 3*a*. The light beam passing through the cavity 3 passes through the objective lens 2, and then is emitted from the objective lens holder 1.

Further, deeply inside the cavity 3, an aperture (beam diameter limiting means) 4 is provided on one side of the objective lens 2 facing the entrance 3*a*. The aperture 4 has an opening 4*a* whose diameter is as large as an effective diameter of the objective lens 2. Therefore, the aperture 4 limits, to an effective diameter 6 of the objective lens, a beam diameter of the incident light beam 12 passing through the cavity 3 from the entrance 3*a* toward the objective lens 2.

The light beam passing through the aperture 4 enters the objective lens 2 with the beam diameter of the light beam maintained at the effective diameter of the objective lens 2, and then is converged on an optical disk (not shown). The light beam is reflected by the optical disk, passes again through the objective lens 2, and then passes through the cavity 3. The light beam is received as a positive signal by a photodetector (not shown).

According to a characteristic arrangement of the present invention, the cavity is surrounded with internal wall surfaces facing each other so that space between the internal wall surfaces gradually increases from the opening of the aperture toward the entrance or the exit. Examples of the shape of such internal wall surfaces include the shape of internal wall surfaces 5 illustrated in FIG. 1. The internal wall surfaces 5 are inclined in a tapered manner so that an internal diameter of the cavity 3 increases from the entrance 3a toward the opening 4a. The term "tapered manner" refers to such a manner that, when the cavity is cut flatways in a direction parallel to an optical axis of the incident light beam, straight lines indicating the internal wall surfaces in cross section are not parallel to each other.

In the following, effects obtained from the foregoing arrangement will be described.

First, dotted lines 27' of FIG. 1 indicate a structure of an aperture of a conventional objective lens holder. As illustrated in FIG. 1, the aperture of the conventional objective lens holder is provided so as to be sandwiched between protrusions perpendicular to the internal wall surfaces of the cavity in cross section. On the other hand, in the objective lens holder 1 of the present embodiment, the aperture 4 is not provided so as to be sandwiched between the perpendicular protrusions. That is, the cavity 3, which is positioned on the side of the aperture 4 facing the entrance 3a, is surrounded with the internal wall surfaces 5 inclined in a tapered manner so that a diameter of the cavity 3 becomes larger from the opening 4 toward the entrance 3a.

This causes the aperture 4 to be stronger than the conventional thin-walled aperture. The aperture 4 does not have a thin wall part as compared with the conventional aperture, and thus becomes more resistant to oscillation than the conventional aperture. Therefore, the objective lens holder 1 becomes more rigid than the conventional objective lens holder.

Further, the objective lens holder 1 is arranged such that the cavity 3, which is positioned on the side of the aperture 4 facing the entrance 3a, is surrounded with the internal wall surfaces 5 inclined in a tapered manner. However, the arrangement of the objective lens holder of the present embodiment is not particularly limited as long as the internal wall surfaces are provided so that the diameter of the cavity 3 increases from the opening toward the entrance.

Figure 2A:
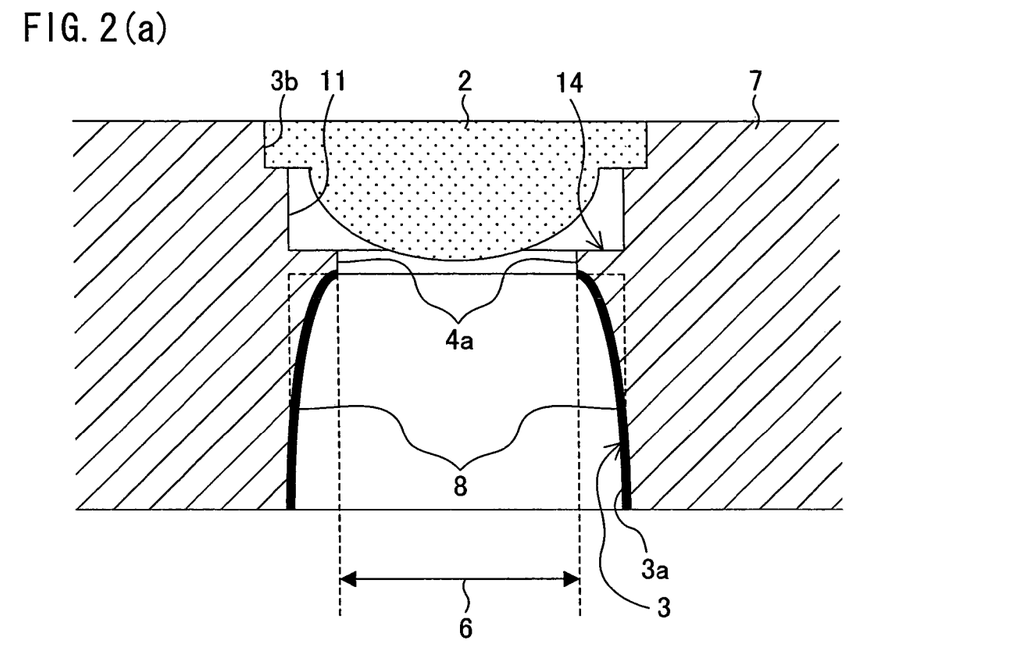
Figure 2B:
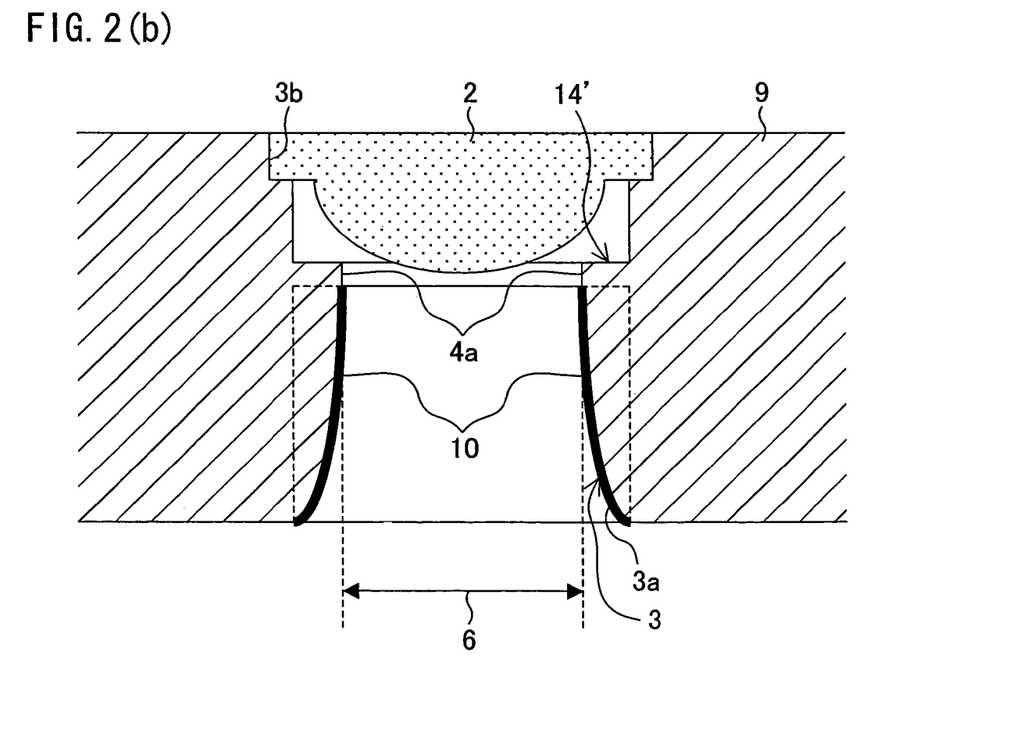

For example, the cavity, which is positioned on the side of the aperture facing the entrance, may be surrounded with the internal wall surfaces inclined in a parabolic manner. FIGS. 2(a) and 2(b) are cross-sectional views schematically illustrating arrangements of the objective lens holder in which the internal wall surfaces are provided in a parabolic manner in longitudinal cross section. In FIG. 2(a), parabolas of the internal wall surfaces in cross section peak on the side of the opening 4a of the aperture. In FIG. 2(b), parabolas of the internal wall surfaces in cross section peak on the side of the entrance 3a. The "parabolic manner" refers to such a manner that, when the cavity is cut flatways in the direction parallel to the optical axis of the incident light beam, a curve of each of the internal wall surfaces in cross section is a parabola. The parabola refers to, but is not limited to, a curve represented by $y=ax^2$ in an x-y coordinate system. The parabola may be part of a curve represented by $y=ax^n$ (where n is an integer). Further, the parabola of the internal wall surface in cross section may have one peak or no peaks.

As illustrated in FIG. 2(a), an objective lens holder 7 is arranged such that: a cavity facing an aperture 14 on the side of its entrance 3a is surrounded with internal wall surfaces 8 inclined in a parabolic manner so that a diameter of the cavity increases from the opening 4a toward the entrance 3a. Moreover, as illustrated in FIG. 2(a), when the cavity is cut flatways in a direction parallel to the direction of the optical axis of the incident light beam, the parabolas of the internal wall surfaces 8 in cross section peak on the side of the opening 4a.

Further, the internal wall surfaces inclined in a parabolic manner may be arranged as illustrated in FIG. 2(b). As illustrated in FIG. 2(b), an objective lens holder 9 is arranged such that: a cavity facing an aperture 14' on the side of its entrance 3a has internal wall surfaces 10 inclined in a parabolic manner so that a diameter of the cavity increases from the opening 4a toward the entrance 3a. Moreover, as illustrated in FIG. 2(b), when the cavity is cut flatways in a direction parallel to the direction of the optical axis of the incident light beam, the parabolas of the internal wall surfaces 10 in cross section peak on the side of the entrance 3a.

Further, in all of FIGS. 1, 2(a), and 2(b), when the cavity is cut flatways parallel to the direction of the optical direction of the incident light beam, the internal wall surfaces in cross section are inclined in a tapered/parabolic manner across a region that extends from the opening to the entrance. However, the shape of the internal wall surfaces is not limited to this. Alternatively, the internal wall surfaces may take any shape as long as a diameter of the cavity in the above region is larger than that of the opening of the aperture.

For example, the internal wall surfaces may be shaped in cross section so as to be inclined in a tapered/parabolic manner from the opening of the aperture, and then take a constant-diameter cylindrical shape from their middle points toward the entrance. Alternatively, the internal wall surfaces may be shaped in cross section such that a plurality of tapered/parabolic lines are connected to one another at different inclinations.

The internal wall surfaces positioned on the side of the aperture facing the entrance may be shaped in cross section so as to be inclined in a tapered/parabolic manner and then take a constant-diameter cylindrical shape from their middle points toward an end of the cavity. Alternatively, the internal wall surfaces may be shaped in cross section such that a plurality of tapered/parabolic lines are connected to one another at different inclinations. In either case, the aperture becomes reinforced as compared with the conventional aperture. Therefore, the objective lens holder becomes more rigid than the conventional objective lens holder.

Further, the internal wall surfaces positioned on the side of the aperture facing the entrance may take the shape of a plurality of small steps, and may be provided such that a diameter of the cavity becomes larger from the opening of the aperture toward the entrance. Furthermore, the internal wall surfaces may be shaped like tiny steps in a tapered/parabolic manner.

That is, in the objective lens holder of the present embodiment, the internal wall surfaces of the cavity only needs to be provided such that a diameter of the cavity is larger than that of the opening of the aperture but smaller than that of the entrance or the exit in at least one part in the direction that extends from the opening to the entrance. Further, the diameter may become larger continuously or stepwise.

Further, in all of FIGS. 1, 2(a), and 2(b), the internal wall surfaces are inclined in a tapered/parabolic manner across a region that extends from an entire circumference of the opening to an entire circumference of the entrance. However, the internal wall surfaces are not limited to this, but only need to be arranged such that a distance between the internal wall surfaces facing each other gradually increases from the opening toward the entrance or the exit. For example, part of the internal wall surfaces may be inclined in a tapered/parabolic manner from the opening of the aperture toward the entrance, while a remaining part of the internal wall surfaces is not inclined.

In this case, part of the opening of the aperture is reinforced, and the remaining part of the opening of the aperture is provided so as to be sandwiched between protrusions that stick out with respect to the internal wall surfaces of the cavity. However, this arrangement causes the objective lens holder to be more rigid than the conventional objective lens holder. Therefore, the objective lens holder allows read/write operations at a higher speed than the conventional objective lens holder.

Further, in all of FIGS. 1, 2(a), and 2(b), the cavity has the internal wall surfaces provided in such a manner that a diameter of the cavity becomes larger from the opening of the aperture toward the entrance. However, the present invention is not limited to this. The internal wall surfaces may be provided in a manner that a diameter of the cavity becomes larger from the opening of the aperture toward the exit. Further, the internal wall surfaces may be provided in such a manner that a diameter of the cavity becomes larger from the opening of the aperture toward both the entrance and the exit.

Further, the objective lens holder of the present invention is preferably made of resin or metal.

In cases where the objective lens holder is made of resin, the resin is preferably resin containing carbon fibers. The resin containing the carbon fibers has a relatively high Young's modulus. Therefore, the aperture becomes more rigid in terms of material properties as well as structural properties. Examples of the resin containing the carbon fibers include PPS (polyphenyl sulfide) resin containing the carbon fibers.

Further, in cases wherein cases where the objective lens holder is made of metal, the metal is preferably light metal. The light metal also has a relatively high Young's modulus. Therefore, the aperture becomes more rigid in terms of material properties as well as structural properties. Examples of the light metal include magnesium alloy or aluminum.

Further, as illustrated in FIGS. 1, 2(a), and 2(b), in the cavity extending from the opening of the aperture to the entrance, the internal wall surfaces of the objective lens holder of the present embodiment preferably have no surfaces perpendicular to the optical axis of the incident light beam.

In cases where the internal wall surfaces have surfaces perpendicular to the optical axis of the incident light beam as with the conventional objective lens holder illustrated in FIG. 8, the incident light beam is perpendicularly reflected by the perpendicular surfaces. That is, an unnecessary reflected light beam generates in the cavity. The reflected light beam is received as stray light by the photodetector so as to overlap the positive signal. This causes signal degradation. Especially, in cases where the objective lens holder is made of metal, there is concern that the unnecessary reflected light, i.e., stray light is generated inside the cavity due to a high surface reflectance of the metal.

Figure 3:
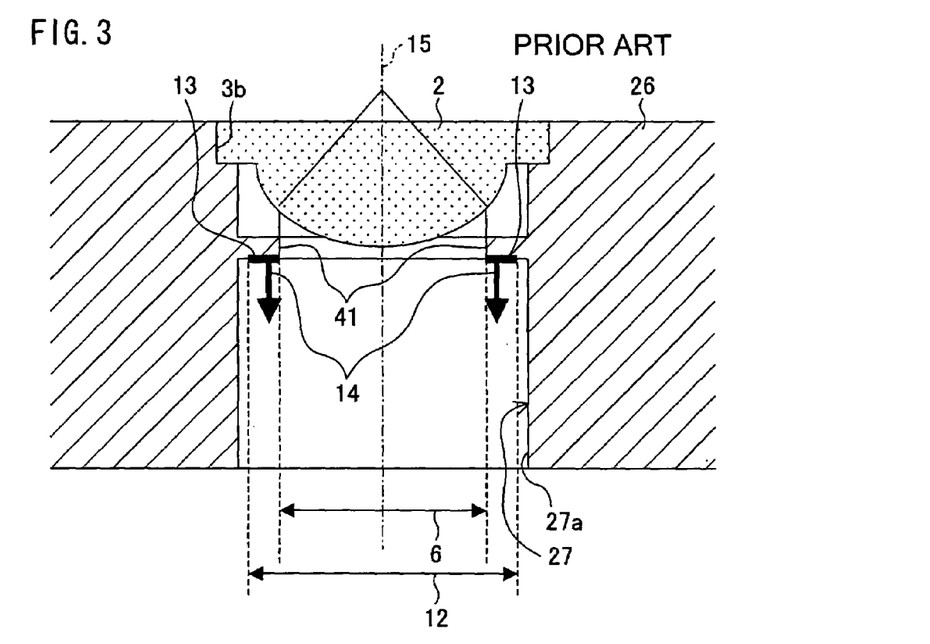
FIG. 3 is a cross-sectional view illustrating an incident light beam passing through a conventional objective lens holder.

However, the objective lens holder of the present embodiment makes it possible to inhibit the reflected light beam from being generated in the cavity. This effect will be described below with reference to FIGS. 3 and 4. FIG. 3 is a cross-sectional view illustrating the conventional objective lens holder through which the incident light beam passes. Further, FIG. 4 is a cross-sectional view illustrating the objective lens holder of the present embodiment through which the incident light beam passes.

As illustrated in FIG. 3, the conventional objective lens holder 26 is arranged such that the aperture 41 is provided between protrusions that stick out perpendicularly to the internal wall surfaces 27a of the cavity 27. That is, the internal wall surfaces 27a have surfaces 13 perpendicular to an optical axis 15 of the incident light beam 12. For this reason, a light beam which is contained in the incident light beam 12 and which has a beam diameter not larger than the effective diameter 6 of the objective lens 2 enters the objective lens 2. On the other hand, a light beam which is contained in the incident light beam 12 and which has a beam diameter larger than the effective diameter 6 is reflected by the surfaces 13 so as to become a reflected light beam 14. The reflected light beam 14 generated by the surfaces 13 is parallel to the optical axis 15. Thus, the reflected light beam 14 reaches the photodetector while overlapping light returning from the optical disk. Therefore, the reflected light beam 14 is received as stray light by the photodetector. This causes degradation in signal quality.

Figure 4:
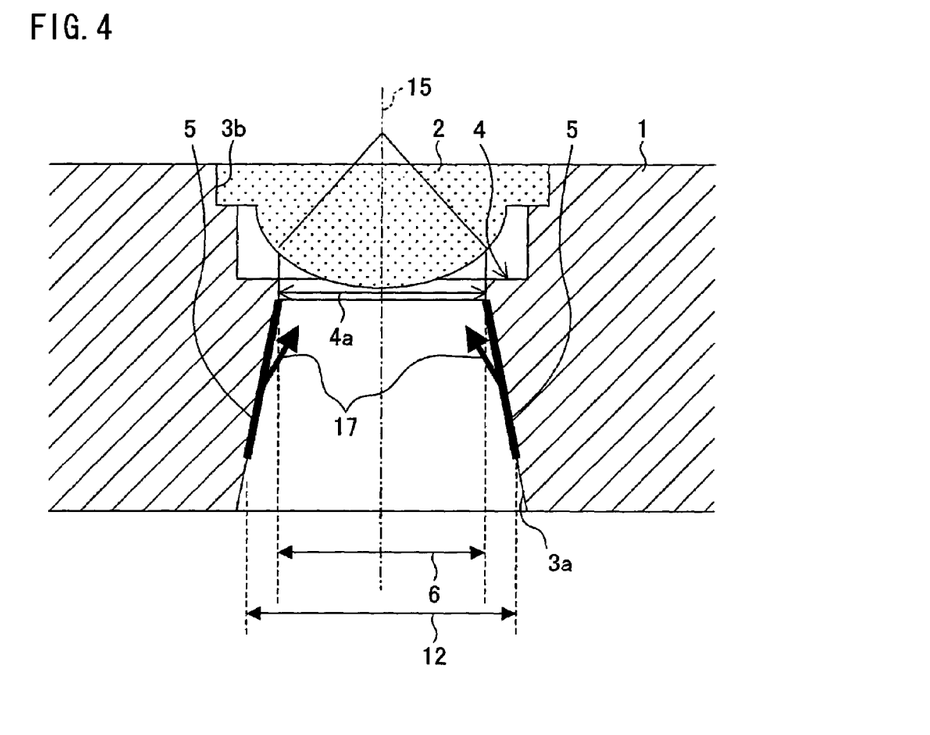
FIG. 4 is a cross-sectional view illustrating the incident light beam passing through the objective lens holder according to the first embodiment of the present invention.

On the other hand, as illustrated in FIG. 4, the objective lens holder 1 is arranged such that the internal wall surfaces 5 are inclined in a tapered manner from the entrance 3a toward the opening 4a. That is, the internal wall surfaces 5 are not perpendicular to the optical axis 15 of the incident light beam 12. The internal wall surfaces 5 reflect a light beam which is contained in the incident light beam 12 and which has a beam diameter larger than the effective diameter 6 of the objective lens 2, so that the light beam becomes a reflected light beam 17. In the objective lens holder 1, the reflected light beam 17 generated by the internal wall surfaces 5 is not parallel to the optical axis 15 of the incident light beam 12. Thus, the reflected light beam 17 does not overlap the light returning from the optical disk, and therefore does not reach the photodetector. Therefore, the reflected light beam 17 does not become stray light. Thus, the objective lens holder 1 makes it possible to inhibit the reflected light beam which can possibly become stray light from being generated in the cavity 3. Therefore, the objective lens holder 1 makes it possible to prevent the signal degradation from occurring in the photodetector.

Further, this effect of preventing the signal degradation in the photodetector is similarly obtained even when the internal wall surfaces are inclined in a parabolic manner.

Further, the objective lens holder of the present embodiment is arranged such that the internal wall surfaces of the cavity take the tapered or parabolic shape. In this way, the internal wall surfaces are more inclined from the entrance toward the opening of the aperture than those of the conventional objective lens holder.

This inclination facilitates die cutting of the objective lens holder when the objective lens is produced by means of mold casting. Therefore, the objective lens holder can be better mass-produced at a lower defective rate than the conventional objective lens holder.

It can be also said that the objective lens holder of the present embodiment is arranged such that: the beam diameter limiting means is provided with a reinforcing section for reinforcing the beam diameter limiting means; and the internal wall surfaces of the cavity gradually increases as the reinforcing section extends from the opening toward the entrance or the exit.

Further, it can be also said that the objective lens holder of the present invention is arranged such that: the cavity serving as a light path has, at the end facing the objective lens, a diameter as large as the effective diameter of the objective lens mounted thereon and has, at the end facing the light source, a diameter larger than the diameter at the end facing the objective lens, so as to increase in a tapered manner.

Second Embodiment

Figure 5:
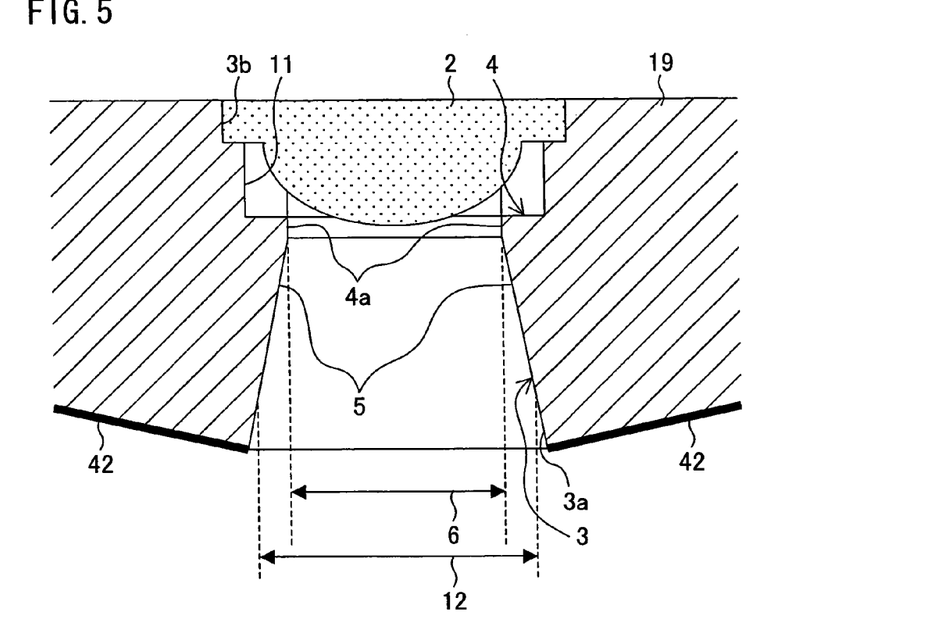
FIG. 5 is a cross-sectional view schematically illustrating an objective lens holder according to a second embodiment of the present invention.
Figure 6:
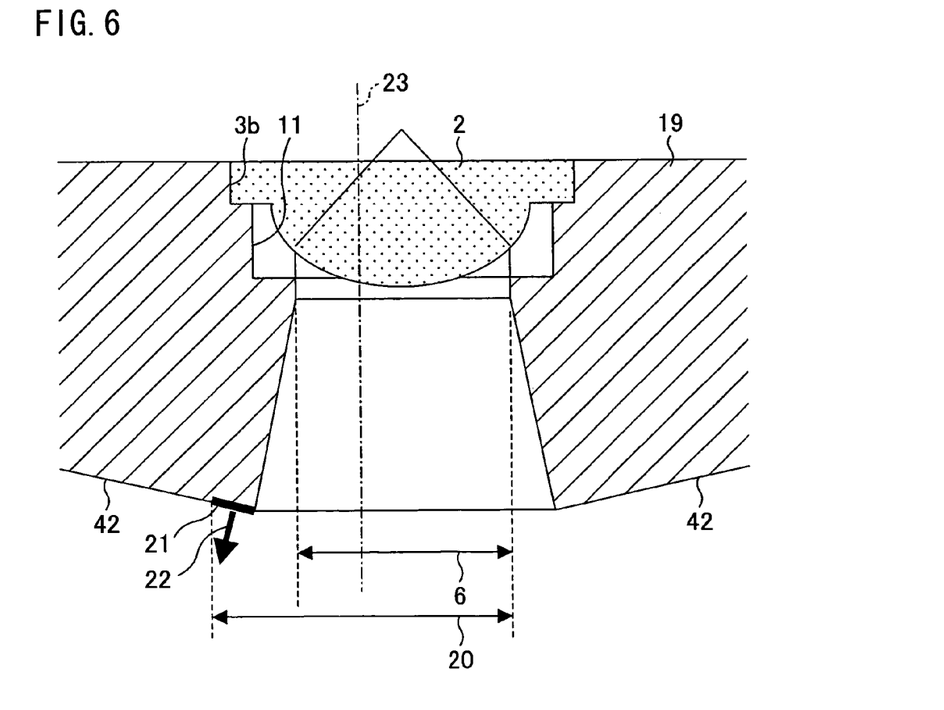
FIG. 6 is a cross-sectional view illustrating the incident light beam entering off course the entrance of the foregoing objective lens holder.

Another embodiment of the present invention will be described below with reference to FIGS. 5 to 7. FIG. 5 is a cross-sectional view schematically illustrating an arrangement of an objective lens holder according to the present embodiment.

As illustrated in FIG. 5, an objective lens holder 19 includes the cavity 3. The cavity 3 has the entrance 3a and the exit 3b. The incident light beam 12 enters the entrance 3a and exits from the exit 3b. Provided on the entrance 3b side of the cavity 3 is the objective lens mounting part 11 for mounting the objective lens 2 therein.

Further, deeply inside the cavity 3, the aperture 4 is provided on one side of the objective lens 2 facing the entrance 3a. The aperture 4 has the opening 4a whose diameter is as large as the effective diameter of the objective lens 2. Therefore, the aperture 4 limits, to the effective diameter 6 of the objective lens, the diameter of the incident light beam 12 passing through the cavity 3 from the entrance 3a to the objective lens 2.

Furthermore, the cavity 3 is surrounded with the internal wall surfaces 5. The internal surfaces 5 are inclined in a tapered manner so that a diameter of the cavity 3 gradually increases from the opening 4a of the aperture 4 toward the entrance 3a.

The objective lens holder 19 further includes an inclined surface 42 inclined with respect to the optical axis of the incident light beam 12, in an area surrounding the entrance 3a, the area including an outer circumference of the entrance 3a. The inclined surface 42 is provided on an end face of the objective lens holder 19 opposite from the objective lens mounting part 11, i.e., on an end face of the objective lens holder 19 where the entrance 3a is provided. The inclined surface 42 has a tapered shape inclined from the entrance 3a of the cavity 3 toward an outer edge of the objective lens holder 19. That is, the inclined surface is inclined so that a diameter of the tapered shape becomes wider. Further, the inclined surface 42 is inclined at such an angle that the inclined surface 42 approaches the upper surface including the exit 3b in the direction from the entrance 3a toward the outer edge of the objective lens holder. Therefore, the objective lens holder 19 is arranged such that the entrance 3a of the cavity 3 is provided so as to be raised toward a light incident side.

Further, the objective lens holder 19 is arranged such that the inclined surface 42 is inclined in a tapered manner. However, the inclined surface 42 is not limited to this arrangement as long as they are inclined with respect to the optical axis of the incident light beam. Examples of the inclined surface include an inclined surface inclined in a parabolic manner from the entrance of the cavity toward the outer edge of the objective lens holder.

Further, the inclined surface may be inclined at such an angle that the inclined surface extends away from the upper surface including the exit 3b in the direction from the entrance toward the outer edge of the objective lens holder.

Further, the objective lens holder 19 is made of metal. The metal is preferably light metal. The light metal has a relatively high Young's modulus. Therefore, the aperture becomes more rigid in terms of both structural and material properties. Examples of the light metal include magnesium alloy or aluminum.

Further, the objective lens holder 19 may be made of such resin material as described in the First Embodiment.

In the following, effects obtained from the arrangement of the objective lens holder 19 will be described.

First, the objective lens holder 19 is arranged such that the cavity 3, which is positioned on the side of the aperture 4 facing the entrance 3a, is surrounded with the internal wall surfaces 5 inclined in a tapered manner. This causes the aperture 4 to be more reinforced and thicker walled as compared with the aperture of the conventional objective lens holder. Thus, the aperture 4 becomes more resistant to oscillation. Therefore, the objective lens holder becomes more rigid than the conventional objective lens holder.

Further, especially when the objective lens holder is made of the metal, there is concern that stray light is generated due to a high surface reflectance of the metal. However, in the cavity which extending from the opening 4a to the entrance 3a, the internal wall surfaces have no surfaces perpendicular to the optical axis of the incident light beam 12. This inhibits the reflected light beam in the cavity from generating stray light.

Furthermore, the objective lens holder 19 includes, on its end face where the entrance is provided, the inclined surface 42 inclined with respect to the optical axis of the incident light beam 12. Therefore, this arrangement of the objective lens holder 19 makes it possible to inhibit stray light that can be generated not only in the cavity but also on the end face of the objective lens holder 19 opposite from the objective lens mounting part 11, i.e., on the end face where the entrance 3a is provided.

This effect will be described below with reference to FIG. 6. FIG. 6 is a cross-sectional view illustrating the incident light beam entering off course the entrance of the objective lens holder of the present embodiment.

When the objective lens holder is greatly shifted in a direction perpendicular to the optical axis of the incident light beam, the incident light beam may also enter the end face of the objective lens holder that is on the opposite side from the objective lens mounting part, i.e., the end face where the entrance is provided. In such a case, the incident light beam is reflected by both the cavity and the end face where the entrance is provided. As a result, the reflected light beam may become stray light.

However, the objective lens holder 19 is arranged so as to include the inclined surface 42 inclined in a tapered manner from the entrance 3a toward the outer edge. When an incident light beam 20 enters the entrance 3a off course as illustrated in FIG. 6, the incident light beam 20 is reflected by a light irradiation surface 21, which causes reflected light beam 22. The reflected light beam 22 is not parallel to an optical axis 23 of the incident light beam 20. In addition, the reflected light beam 22 does not return to the light source. For these reasons, the reflected light beam 22 does not overlap the light beam returning from the optical disk, and therefore does not reach the photodetector. Therefore, the reflected light beam 22 does not become stray light. Thus, the objective lens holder 19 makes it possible to prevent the reflected light beam from being generated both in the cavity 3 and on the end face where the entrance 3a is provided. Therefore, the objective lens holder 19 makes it possible to prevent the signal degradation in the photodetector.

Further, this effect of preventing the signal degradation in the photodetector is similarly obtained by using the objective lens holder arranged such that the inclined surface is inclined in a parabolic manner from the entrance toward the outer edge of the objective lens holder.

Furthermore, the objective lens holder of the present embodiment is preferably arranged so as to further include a reference surface provided on an end face of the objective lens holder where the entrance is provided and near an outer edge of the objective lens holder, the reference surface being perpendicular to an optical axis of the incident light beam. In the following, this arrangement of the objective lens holder provided with the reference surface perpendicular to the optical axis of the incident light beam will be described with reference to FIG. 7. FIG. 7 is a cross-sectional view schematically illustrating the arrangement of the objective lens holder provided with the reference surface perpendicular to the optical axis of the incident light beam.

Figure 7:
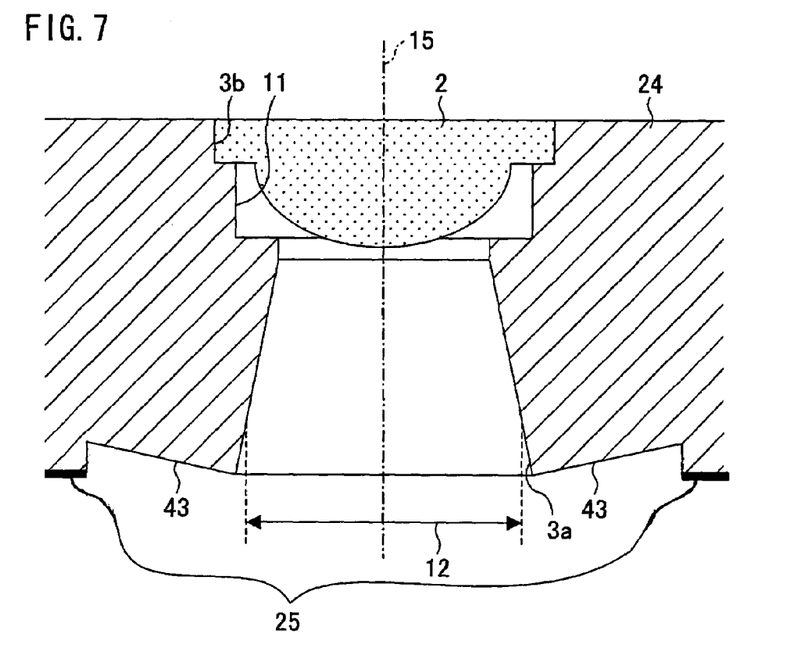
FIG. 7 is a cross-sectional view schematically illustrating an arrangement of the objective lens holder provided with a reference surface perpendicular to an optical axis of the incident light beam.

As illustrated in FIG. 7, the objective lens holder 24 is arranged so as to include a reference surface 25, the reference surface 25 being provided on the end face where the entrance 3a is provided and near an outer edge of an inclined surface 43. As with the inclined surface 42 illustrated in FIG. 5, the inclined surface 43 are inclined in a tapered manner from the entrance 3a toward the outer edge. Further, the reference surface 25 is provided near the outer edge of a side of the entrance 3a so as to be perpendicular to the optical axis 15 of the incident light beam 12. Further, the reference surface 25 is provided so as to be closer to the incident light beam than the inclined surface 43.

Thus, the reference surface 25 perpendicular to the optical axis of the incident light beam is provided on the end face of the objective lens holder where the entrance 3a is provided and near the outer edge of the objective lens holder. With this arrangement, the reference surface 25 can be used as a reference in assembling a driving unit including the objective lens holder 24. This makes it possible to improve the precision of assembling the driving unit including the objective lens holder.

Further, the objective lens holder of the present embodiment is arranged such that the internal wall surfaces of the cavity are provided in a tapered or parabolic manner so that the internal wall surfaces are more inclined from the entrance toward the opening than those of the conventional objective lens holder. Further, the inclined surface is provided in a tapered/parabolic manner on the end surface where the entrance is provided so that the inclined surface is more inclined on the end face than on that of the conventional objective lens holder.

This inclination facilitates die cutting of the objective lens holder when the objective lens is produced by means of mold casting. Therefore, the objective lens holder can be better mass-produced at a lower defective rate than the conventional objective lens holder.

Third Embodiment

Figure 9:
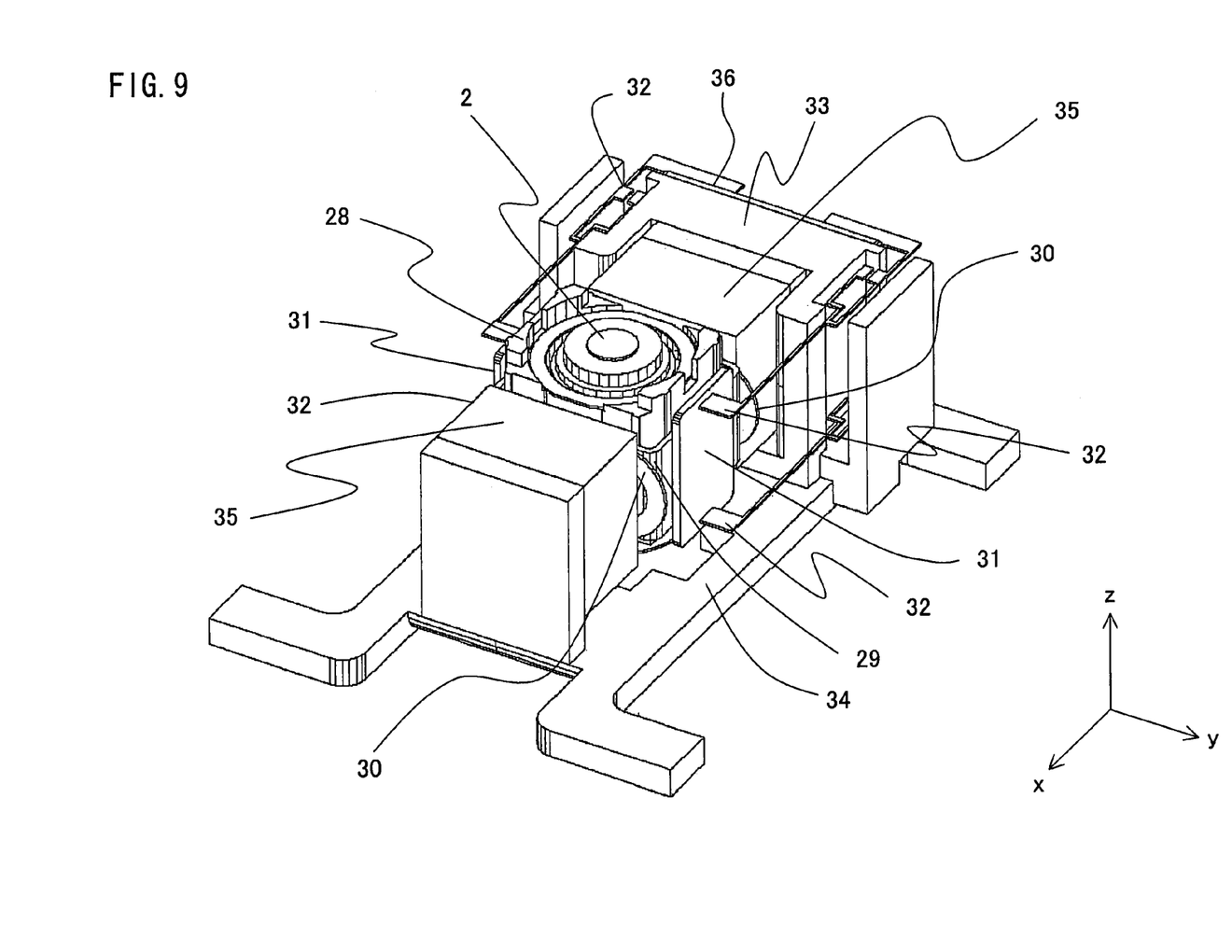
FIG. 9 is a perspective view schematically illustrating an arrangement of an objective lens driving device of the present invention.

Yet another embodiment of the present invention will be described below with reference to FIG. 9. FIG. 9 is a perspective view schematically illustrating an arrangement of an objective lens driving device according to the present embodiment.

As illustrated in FIG. 9, the objective lens driving device 100 includes a driving unit section, a supporting mechanism section, and a fixing section including a magnetic circuit.

Prior to the detailed description of the objective lens driving device, x, y, and z directions in a three-dimensional orthogonal coordinate system are defined as follows. As illustrated in FIG. 9, the x direction is defined as a direction in which plate springs 32 extend. The plate springs 32 movably support the diving unit section. The x direction corresponds to a track tangential direction of the optical disk when the objective lens driving device carries out read/write operations of the optical disk. The x direction is hereinafter referred to as "tangential direction x".

Further, the y direction is defined as a direction orthogonal to the tangential direction x. The y direction is located on the same horizontal plane as the tangential direction x. The y direction corresponds to a radial direction of the optical disk when the objective lens driving device carries out read/write operations of the optical disk. The y direction is hereinafter referred to as "radial direction y".

Furthermore, the z direction is defined as a direction orthogonal to both the directions x and y. The z direction corresponds to a focus direction of the optical disk when the objective lens driving device carries out read/write operations of the optical disk. The z direction is hereinafter referred to as "focus direction z".

The driving unit section includes: the objective lens 2; an objective lens holder 28, which holds the objective lens 2; a focus coil 29; radial coils 30; and driving unit substrates 31. The focus coil 29 is provided so as to be wound around an outer circumferential surface of the objective lens holder 28. The radial coils 30 face each other in the tangential direction x so as to sandwich the objective lens holder 28, and are fixed to an outer circumferential surface of the focus coil 29. Further, the driving unit substrates 31 face each other in the radial direction y so as to sandwich the objective lens holder 28, and are fixed to the outer circumferential surface of the focus coil 29.

The two driving unit substrates 31 are provided so as to link the supporting mechanism section and the driving unit section. Further, the objective lens driving device 100 may be arranged so as not to include the driving unit substrates 31. In this case, the objective lens driving device may be arranged such that the supporting mechanism section is mounted directly on the objective lens holder.

Further, the objective lens holder 28 is arranged in the same manner as in the First or Second Embodiment. That is, the cavity of the objective lens holder 28 and the end face of the objective lens holder 28 where the entrance of the cavity is provided are arranged in the same manner as described in the First or Second Embodiment.

Further, the objective lens holder 28 is made of resin material or metal. In cases where the objective lens holder 28 is made of the resin material, the resin material is for example PPS (polyphenyl sulfide) resin containing carbon fibers. Further, in cases where the objective lens holder 28 is made of the metal, the metal is for example magnesium alloy or aluminum.

The supporting mechanism section corresponds to the elastic supporting mechanism described in patent claims set forth below. The supporting mechanism section is realized by the plate springs 32. Movable ends of the plate springs 32 are fixed to the two driving unit substrates 31. The plate springs 32 cantilever the objective lens holder 28 at four points through the driving unit substrates 31. The plate springs 32 are preferably made of nonmagnetic metal. For example, the plate springs 32 are made of BeCu.

Further, a member for supporting the objective lens holder 28 is not limited to the plate springs. An example of such a supporting member is a wire that is concentric in cross section. In this case, the wire is made for example of phosphorous bronze.

The fixing section includes: magnets 35 which constitute a magnetic circuit; a yoke 34; a damper block 33; and a fixing section substrate 36 which fixes the supporting mechanism section to the fixing section. The magnets 35 face each other in the tangential direction x so as to sandwich the objective lens holder 28. The magnets 35 generate a magnetic field necessary for tracking control and focusing control.

Into a portion of the damper block 33 where each of the plate springs 32 penetrates, a damper agent (not shown) is injected.

Note that the focus coil 29, the radial coils 30, the magnets 35, and the yoke 34 are components of the driving mechanism described in the patent claims set out below.

The foregoing arrangement makes it possible to realize the objective lens driving device including a highly rigid driving unit. Since the driving device has the highly rigid driving unit, the driving device exhibits a high resonant frequency and therefore realizes a wide-bandwidth servo characteristic.

The embodiments of the present invention will be described below in detail by way of examples with reference to the accompanying drawings. The present invention is not limited to the examples below, and details of the present invention may be varied in many ways. The present invention is not limited to the description of the embodiments above, but may be altered by a skilled person within the scope of the claims. An embodiment based on a proper combination of technical means disclosed in different embodiments is encompassed in the technical scope of the present invention.

EXAMPLE 1

Figure 10:
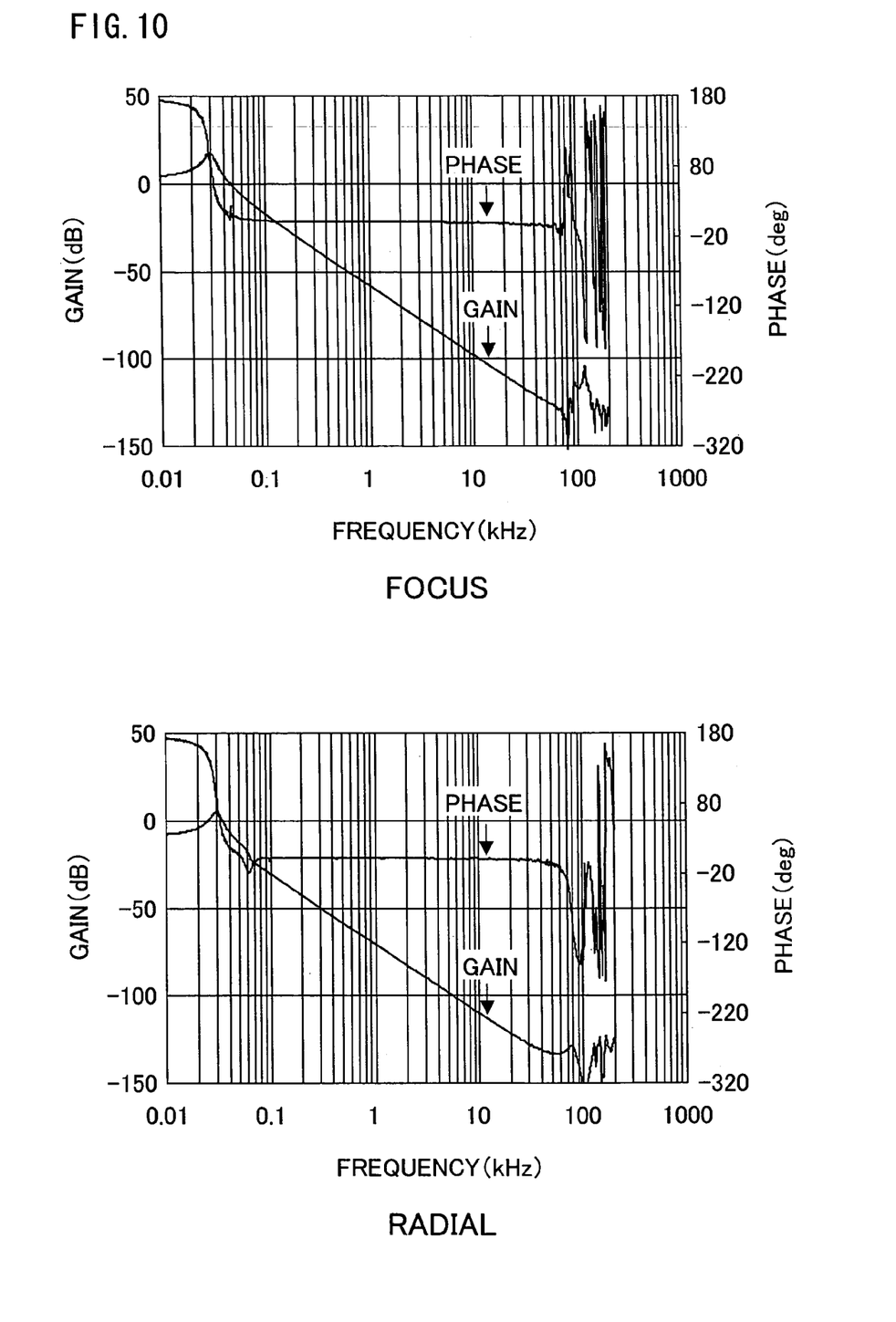
FIG. 10 is a graph showing open-loop frequency characteristics in the focus and radial directions, which open-loop frequency characteristics are obtained from the objective lens driving device of the present invention wherein the objective lens holder is made of PPS (polyphenyl sulfide) resin containing carbon fibers.

An open-loop frequency characteristic in the focus direction z and an open-loop frequency characteristic in the radial direction y were measured by using the objective lens driving device 100. In the present example, the objective lens holder 28 is made of PPS (polyphenyl sulfide) resin containing carbon fibers. The measurement results are described below. FIG. 10 is a graph showing the open-loop frequency characteristic in the focus direction z and the open-loop frequency characteristic in the radial direction y, which open-loop frequency characteristics are obtained from the objective lens driving device used in the present example.

As shown in FIG. 10, the driving unit causes a high resonant frequency of approximately 100 kHz. This frequency is very high considering, for example, that an objective lens driving device generally used for a DVD read/write drive exhibits a resonant frequency of approximately 50 kHz at most. Further, the objective lens driving device 100 exhibits a low gain peak of approximately 20 dB. Therefore, the objective lens driving device 100 realizes a wider-bandwidth servo characteristic than the conventional objective lens driving device.

EXAMPLE 2

Figure 11:
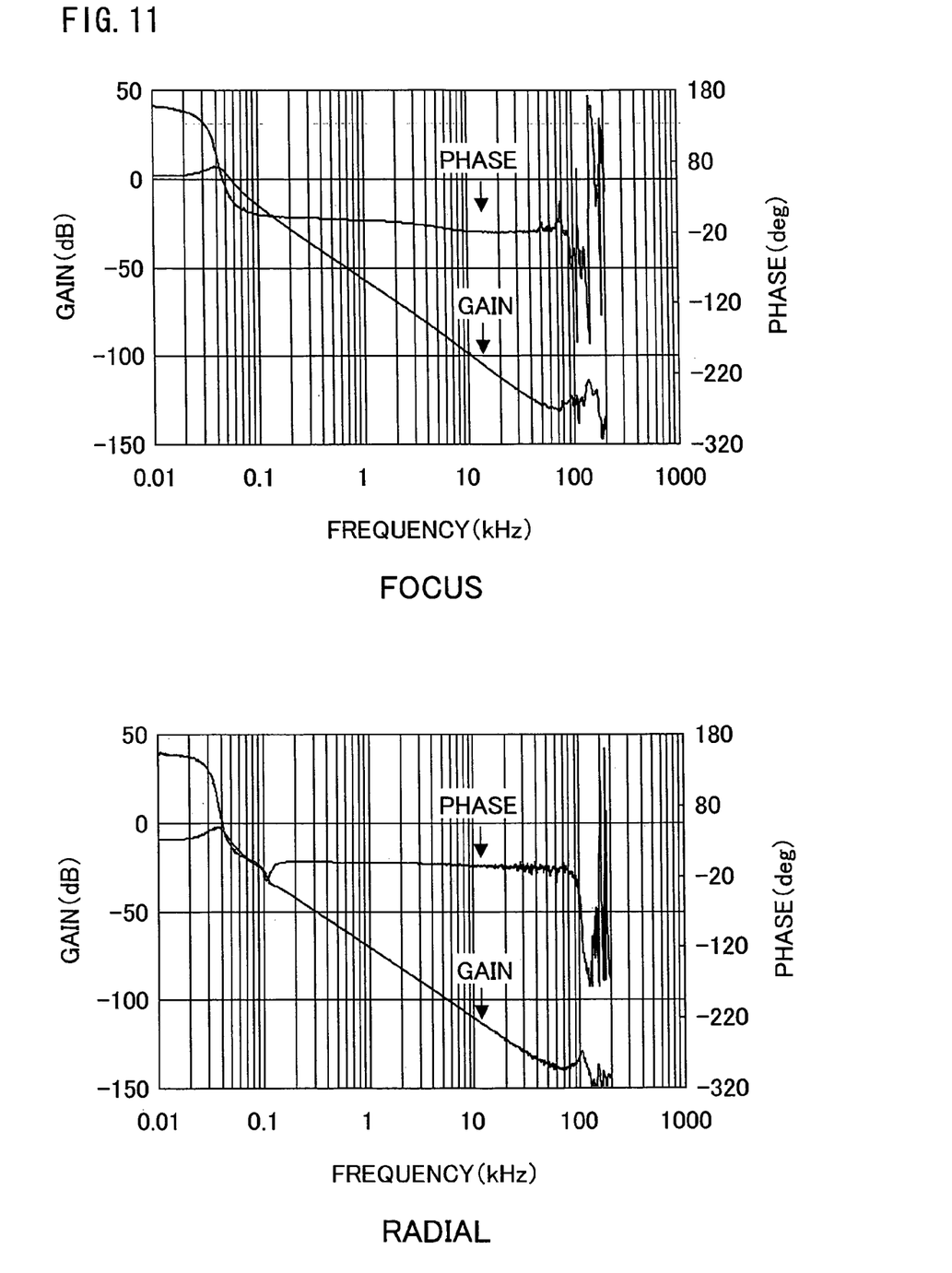
FIG. 11 is a graph showing open-loop frequency characteristics in the focus and radial directions, obtained from the objective lens driving device of the present invention wherein the objective lens is made of magnesium alloy.

The open-loop frequency characteristic in the focus direction z and the open-loop frequency characteristic in the radial direction y were measured by using the objective lens driving device 100. In the present example, the objective lens holder 28 is made of magnesium alloy. The measurement results are described below. FIG. 11 is a graph showing the open-loop frequency characteristic in the focus direction z and the open-loop frequency characteristic in the radial direction y, which open-loop frequency characteristics are obtained from the objective lens driving device used in the present example. Note that FIG. 11 is drawn in the same manner as FIG. 10.

As shown in FIG. 11, the resonant frequency is 100 kHz or higher in both the focus direction z and the radial direction y. This resonant frequency is higher than that obtained when the objective lens holder 28 of Example 1 is made of PPS (polyphenyl sulfide) resin containing carbon fibers. The objective lens driving device 100 of the present example exhibited a gain peak of approximately 20 dB, which is about the same as the objective lens driving device 100 of Example 1. Therefore, the objective lens driving device 100 of the present example realizes a wider-bandwidth servo characteristic than the objective lens driving device 100 of Example 1.

By thus using the objective lens driving device of the present invention, a wide-bandwidth servo characteristic is obtained. This makes it possible to realize high-speed read/write operations. That is, the objective lens driving device of the present invention addresses a recent trend toward high transfer rate read/write operations.

As described above, an objective lens holder of the present invention is arranged such that the cavity is surrounded with internal wall surfaces facing each other so that space between the internal wall surfaces gradually increases from the opening of the beam diameter limiting means toward the entrance or the exit. This makes it possible to provide a highly rigid objective lens holder. Further, since the beam diameter limiting means is highly rigid, the beam diameter limiting means never becomes a source of resonant oscillation. Further, an objective lens driving device of the present invention includes the objective lens holder. Therefore, the objective lens driving device of the present invention exhibits a high resonant frequency and realizes a wide-bandwidth servo characteristic. Furthermore, an optical disk read/write device of the present invention includes the objective lens driving device. Therefore, the optical disk reading/writing device of the present invention allows high-speed read/write operations.

Further, the objective lens holder of the present invention may be arranged, for example, such that the internal wall surfaces are provided so that a diameter of the cavity gradually increases from the opening toward the entrance.

The objective lens holder of the present invention is preferably arranged such that, in the cavity extending from the opening to the entrance, the internal wall surfaces have no surfaces perpendicular to an optical axis of the incident light beam.

In such a case that, in the cavity extending from the opening to the entrance, the internal wall surfaces have the surfaces perpendicular to the optical axis of the incident light beam, the incident light beam is perpendicularly reflected by the perpendicular surfaces. This causes generation of an unnecessary reflected light in the cavity. The reflected light beam becomes stray light so as to overlap the positive signal in the photodetector. This causes signal degradation.

According to the foregoing arrangement, however, in the cavity extending from the opening to the entrance, the beam diameter limiting means does not have the surface perpendicular to the optical axis of the incident light beam. This makes it possible to inhibit the reflected light beam from being generated in the cavity.

Further, according to the foregoing arrangement, the internal wall surfaces have no surfaces perpendicular to the optical axis of the incident light beam. Therefore, the internal wall surfaces are more inclined from the entrance toward the opening than those of the conventional objective lens holder.

This inclination facilitates die cutting of the objective lens holder when the objective lens is produced by means of mold casting. Therefore, the objective lens holder can be better mass-produced at a lower defective rate than the conventional objective lens holder.

The objective lens holder of the present invention is preferably arranged such that the internal wall surfaces have a tapered shape in cross section in a direction of an optical axis of the incident light beam.

According to the foregoing arrangement, the beam diameter limiting means is reinforced as compared with the conventional beam diameter limiting means. This allows the beam diameter limiting means to be rigid in terms of structural properties. Further, the internal wall surfaces are more inclined than the conventional ones. This inclination facilitates die cutting of the objective lens holder when the objective lens is mass-produced by means of mold casting. Therefore, the objective lens holder can be mass-produced at a lower defective rate than the conventional objective lens holder. This contributes to improvement of mass productivity.

Further, this effect can be similarly obtained even when the objective lens holder of the present invention is arranged such that the internal wall surfaces are provided in a parabolic manner in cross section in a direction of an optical axis of the incident light beam.

The objective lens holder of the present invention is preferably arranged so as to further include an inclined surface provided on an end face of the objective lens holder where the entrance is provided and in an area surrounding the entrance, the area including an outer circumference of the entrance, the inclined surface being inclined with respect to an optical axis of the incident light beam.

According to the foregoing arrangement, even when part of the incident light beam enters the entrance of the cavity off course and enters the end face where the entrance is provided, i.e., an area outside of the cavity, the part of the incident light beam enters the inclined surface inclined with respect to the optical axis of the incident light beam. The light beam reflected by the inclined surface is displaced from the optical axis of the incident light beam. This brings about an effect of preventing generation of stray light.

The objective lens holder of the present invention is preferably arranged such that the inclined surface is inclined from the entrance toward an outer edge of the objective lens holder so as to be raised from the outer edge toward the entrance.

According to the foregoing arrangement, the inclined surface is inclined from the entrance toward the outer edge of the objective lens holder so as to be raised from the outer edge toward the entrance. Therefore, even when the part of the incident light beam enters the area outside of the cavity, the incident light beam is reflected by the inclined surface in a direction deviated from the optical axis. This makes it possible to further prevent the generation of stray light.

The objective lens holder of the present invention is preferably arranged so as to further include a reference surface provided on an end face of the objective lens holder where the entrance is provided and near an outer edge of the objective lens holder, the reference surface being perpendicular to an optical axis of the incident light beam.

According to the foregoing arrangement, the reference surface perpendicular to the optical axis is used for assembling the objective lens driving device. This makes it easy to assemble the objective lens driving device.

The objective lens holder is preferably made of resin material containing carbon fibers.

According to the foregoing arrangement, the resin material containing the carbon fibers has a relatively high Young's modulus. This allows the aperture to be rigid in terms of material properties as well as structural properties.

The objective lens holder is preferably made of light metal.

According to the foregoing arrangement, the light metal has a relatively high Young's modulus. This allows the aperture to be rigid in terms of material properties as well as structural properties.

Further, the light metal generally has a high surface reflectance. However, since the beam diameter limiting means does not have the surface perpendicular to the optical axis of the incident light beam, the reflected light beam is prevented from being generated in the cavity. This brings about an effect of preventing the generation of stray light.

The objective lens driving device of the present invention is preferably arranged so as to include: an objective lens; an elastic supporting mechanism for movably supporting the objective lens in an elastic manner; and a driving mechanism for electromagnetically driving the objective lens.

As described above, the objective lens holder of the present invention brings about an effect of providing the highly rigid objective lens holder. Therefore, the present invention can be applied to the industry of the optical disk reading/writing device.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An objective lens holder, comprising:
   (i) an objective lens;
   (ii) a cavity, having an entrance and an exit for holding said objective lens in the cavity therebetween and for receiving and discharging respectively an incident light beam entering said entrance, said exit being provided on a side of said cavity; and
   (iii) beam diameter limiting means having an opening for limiting, to an effective diameter of the objective lens, a beam diameter of said incident light beam passing through said cavity, wherein:
   said cavity is surrounded with internal wall surfaces facing each other so that a space between said internal wall surfaces gradually increases from said opening of said beam diameter limiting means toward said entrance or said exit.

2. The objective lens holder as set forth in claim 1, wherein the internal wall surfaces are provided so that a diameter of the cavity gradually increases from the opening toward the entrance.

3. The objective lens holder as set forth in claim 1, wherein, in the cavity extending from the opening to the entrance, the internal wall surfaces have no surfaces perpendicular to an optical axis of the incident light beam.

4. The objective lens holder as set forth in claim 1, wherein the internal wall surfaces have a tapered shape in cross section in a direction of an optical axis of the incident light beam.

5. The objective lens holder as set forth in claim 1, wherein the internal wall surfaces are provided in a parabolic manner in cross section in the direction of an optical axis of the incident light beam.

6. The objective lens holder as set forth in claim 1, further comprising an inclined surface provided on an end face of the objective lens holder where the entrance is provided and in an area surrounding the entrance, the area including an outer circumference of the entrance, the inclined surface being inclined with respect to an optical axis of the incident light beam.

7. The objective lens holder as set forth in claim 6, wherein: the inclined surface is inclined from the entrance toward an outer edge of the objective lens holder so as to be raised from the outer edge toward the entrance.

8. The objective lens holder as set forth in claim 1, further comprising a reference surface provided on an end face of the objective lens holder where the entrance is provided and near an outer edge of the objective lens holder, the reference surface being perpendicular to an optical axis of the incident light beam.

9. The objective lens holder as set forth in claim 1, being made of resin material containing carbon fibers.

10. The objective lens holder as set forth in claim 1, being made of light metal.

11. An objective lens driving device comprising:
 (i) the objective lens holder of claim 1;
 (ii) an elastic supporting mechanism for movably supporting the objective lens holder in an elastic manner; and
 (iii) a driving mechanism for electromagnetically driving the objective lens holder.

12. An optical disk read/write device, including the objective lens driving device as set forth in claim 11.

* * * * *